United States Patent [19]

Weisburn et al.

[11] Patent Number: 5,259,498
[45] Date of Patent: Nov. 9, 1993

[54] CONTAINER FOR COMPACT DISC

[75] Inventors: James T. Weisburn, Massillon; Craig C. Weidman, Wooster, both of Ohio

[73] Assignee: Alpha Enterprises, Inc., North Canton, Ohio

[21] Appl. No.: 784,321

[22] Filed: Oct. 29, 1991

[51] Int. Cl.$^5$ ............................................. B65D 5/50
[52] U.S. Cl. ........................... 206/45.15; 206/45.19; 206/309; 206/310; 206/312
[58] Field of Search ............... 206/44 R, 45.11, 45.13, 206/45.14, 45.15, 45.19, 307, 309, 310, 311, 312, 313, 444

[56] References Cited

U.S. PATENT DOCUMENTS

| | | | |
|---|---|---|---|
| 4,535,888 | 8/1985 | Nusselder | 206/444 |
| 4,589,549 | 5/1986 | Hehn | 206/387 |
| 4,623,062 | 11/1986 | Chase et al. | 206/444 X |
| 4,694,954 | 9/1987 | Moss | 206/45.26 |
| 4,702,369 | 10/1987 | Philosophe | 206/312 |
| 4,718,547 | 1/1988 | MacTavish | 206/309 |
| 4,750,611 | 6/1988 | Morrone | 206/309 X |
| 4,760,914 | 8/1988 | Gelardi et al. | 206/1.5 |
| 4,778,047 | 10/1988 | Lay | 206/311 X |
| 4,793,480 | 12/1988 | Gelardi et al. | 206/312 |
| 4,867,302 | 9/1989 | Takahashi | 206/312 X |
| 4,871,065 | 10/1989 | Hehn et al. | 206/387 |
| 4,895,252 | 1/1990 | Nomula et al. | 206/312 X |
| 4,899,879 | 2/1990 | Rosen | 206/445 |
| 4,903,829 | 2/1990 | Clemens | 206/310 |
| 4,925,023 | 5/1990 | Goldblatt et al. | 206/309 |

Primary Examiner—David T. Fidei
Attorney, Agent, or Firm—Michael Sand Co.

[57] ABSTRACT

A container construction and method for displaying a compact disc for sale and for subsequent storage thereof after purchase by a consumer. The container comprises a base having a storage compartment, a tray pivotally mounted on the base for releasably holding a compact disc, and a lid pivotally mounted on the base for enclosing the tray and disc within the storage compartment of the base to protect the compact disc when not in use after purchase. A locking mechanism is provided on first ends of the base, tray and lid and lock the base, lid and tray in a generally flat extended end-to-end relationship for display with the tray being pivoted into the lid so that the compact disc is secure between the lid and tray. Graphic sheets are placed over the base and lid when in the extended and locked position, and then covered with a clear plastic wrapper for display. After purchase, the wrapper and graphic sheets are removed and the base and lid pulled slightly apart to an unlocked position. Next the lid is pivoted to a closed position within the storage compartment of the base carrying with it the tray and compact disc, placing the tray in a retained useable position within the base for subsequent placement and removal of the disc therefrom upon pivotal movement of the lid only between an open access position and closed storage position.

17 Claims, 10 Drawing Sheets

FIG-3
FIG-4
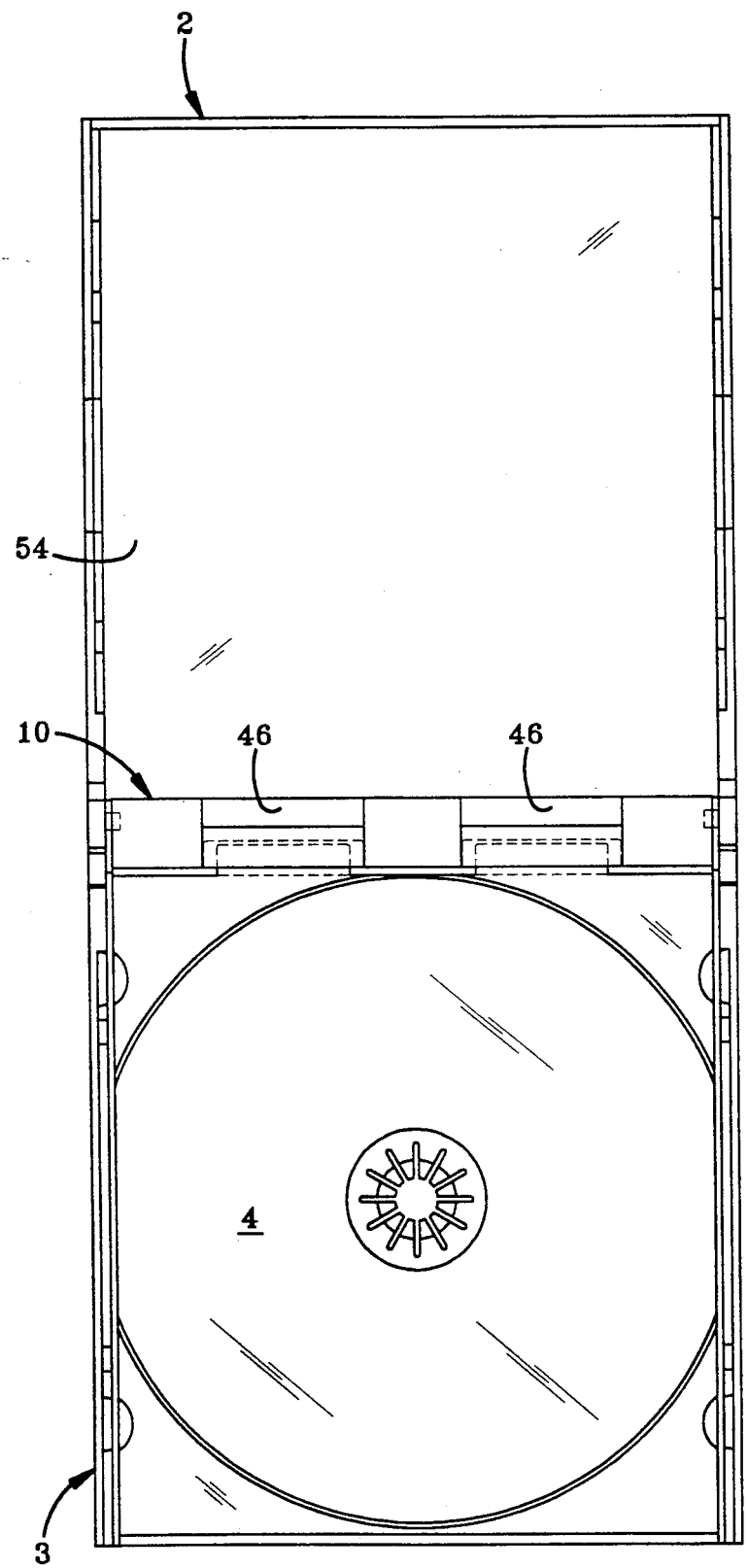
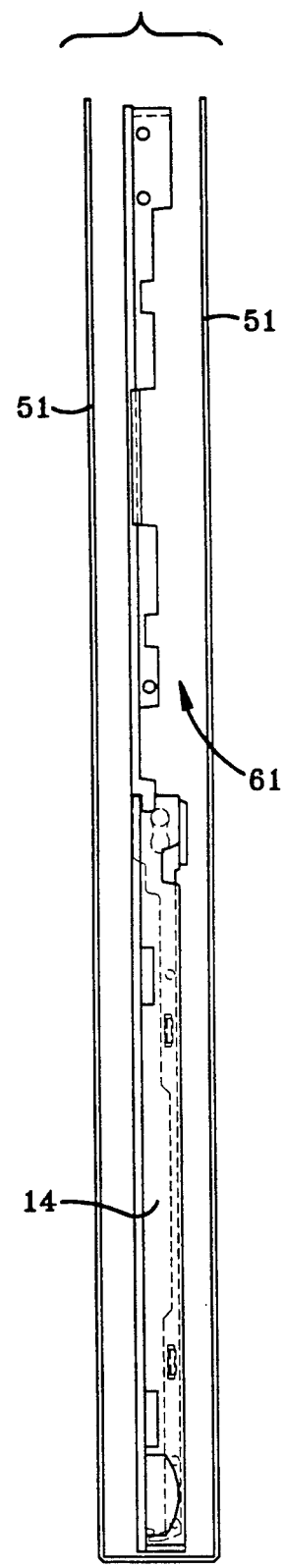

CONTAINER FOR COMPACT DISC

BACKGROUND OF THE INVENTION

1. Technical Field

The invention relates to a container for a recording medium and, in particular, for a compact disc. More particularly, the invention relates to such a container which provides both a convenient means for displaying a compact disc in a secured position and for subsequently storing the compact disc when not in use after purchase by a customer.

2. Background Information

Compact discs, referred to as CD's, have become increasingly popular for storing recorded medium. Currently, most compact discs are placed in a clear plastic container commonly referred to as "jewel box" for display and continued storage after purchase. These jewel boxes then are placed in various types of security packages for subsequent display in a retail establishment. Due to the relatively flat and small size of the jewel box, they are susceptible to theft but must be adequately displayed to facilitate the sale thereof. Several examples of these jewel boxes are shown in U.S. Pat. Nos. 4,793,480, 4,702,369, and 4,903829. The security packages in which the jewel boxes are placed increase the size of the overall package making it more difficult to remove from a store without detection, and they retard removal of the jewel box from within the package without arousing suspicion of a sales person.

Another type of a package for compact discs uses six by twelve inch cardboard panels which encloses the jewel box which then is wrapped with a clear plastic outer wrapping. This requires disposal of the wrapping and the cardboard panel which is both expensive to the manufacturer, and results in an ecological problem due to the excess packaging material that must be disposed. Another example of such a cardboard package is shown in U.S. Pat. No. 4,694,954. Also, these prior art security containers for holding the compact disc and jewel box increases the expense to the retail store even if the security containers are reusable.

It is important that any such container for a compact disc enables the compact disc to be displayed for ease of inspection by a consumer, yet provide theft and physical protection for the disc when displayed, and which results in discarding a minimal amount of packaging material upon removal of the compact disc, thereby making the container and container ecologically desirable. Furthermore, the container preferably is reusable by the retailer for repackaging should a purchased container be returned by a customer. Also, it is desirable that the container be adaptable for use in existing storage and display equipment to make it attractive to the retail establishment to avoid replacement of costly display and storage equipment.

Thus, the need exists for an improved security container for compact discs or other recorded medium which provides the desired security without materially affecting the display features thereof, which is cost effective, compatible with existing display and storage equipment, and is ecologically efficient.

SUMMARY OF THE INVENTION

Objectives of the invention include providing an improved container for compact discs and other recorded medium which has an increased size when in a display condition to retard theft thereof, and which is adaptable for use in existing display equipment enabling it to be easily viewed by a perspective purchasers.

Still another objective is to provide such a container which protects the compact disc from theft as well as from physical damage when in its displayed position, and which requires a minimum amount of packaging material thereby making it ecologically acceptable.

A still further objective is to provide such a container which after purchase by a customer, conforms to the accepted size and configuration of a usual jewel box, enabling the purchaser to store it in existing home and auto storage equipment, while providing physical protection for the disc when in the container, and which retards the entrance of dust and dirt into the container.

Another objective is to provide such an improved container which is adaptable for use in existing manufacturing, assembling and processing systems, thereby enabling the discs to be loaded into the containers with existing procedures and equipment, and which enables the protective outer wrapping to be applied with existing equipment.

Still another objective of the invention is to provide such a container in which the informational graphics is easily viewed on the container when in its display position, and then is retained within the container after purchase by a consumer.

These objectives and advantages are obtained by the improved container of the invention which is used for displaying and storing a compact disc, the general nature of which may be stated as including a base; a lid pivotally mounted on the base for movement between a fully open display position, in which position the lid extends generally in the same plane as the base, and a closed storage position wherein the lid is juxtaposed on the base for retaining a compact disc therebetween; first lock means for maintaining the lid in its fully open display position; a tray for holding a compact disc between the lid and tray when the lid is in the fully open display position and for holding the disc within the base after the lid has been moved to the closed storage position; and pivot means for moving the lid between the fully open position and the closed position, and for moving the tray from a juxtaposition with the lid when the lid is in the fully open position to a position within the base after the lid has moved to the closed position.

These objectives and advantages are obtained further by the improved method of the invention for displaying and storing a compact disc, the general nature of which may be stated as including the steps of providing a base having a storage compartment formed therein, a lid, and a compact disc storage tray having means formed thereon for holding a compact disc within the tray, said tray being pivotally mounted on a first end of the lid; providing mutually engageable locking means on the first end of the lid and on a first end of the base; moving the first ends of the base and lid toward each other to engage the locking means whereby the base and lid are locked together in an extended end-to-end position and lie generally in a common plane for display; pivotally moving the tray containing a compact disc into juxtaposition with the lid to enclose the disc between the lid and tray; and covering the lid and base when in the locked end-to-end relationship with a protective wrapper for subsequent display.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 3 is a top plan view of the container in the extended end-to-end locked position with the graphics sheets and protective wrapping removed therefrom;

FIG. 4 is a side elevational view of the container of FIG. 3 including a pair of graphic sheets shown separated from the container;

Similar numerals refer to similar parts throughout the drawings.

DESCRIPTION OF THE PREFERRED EMBODIMENT

Figure 1:
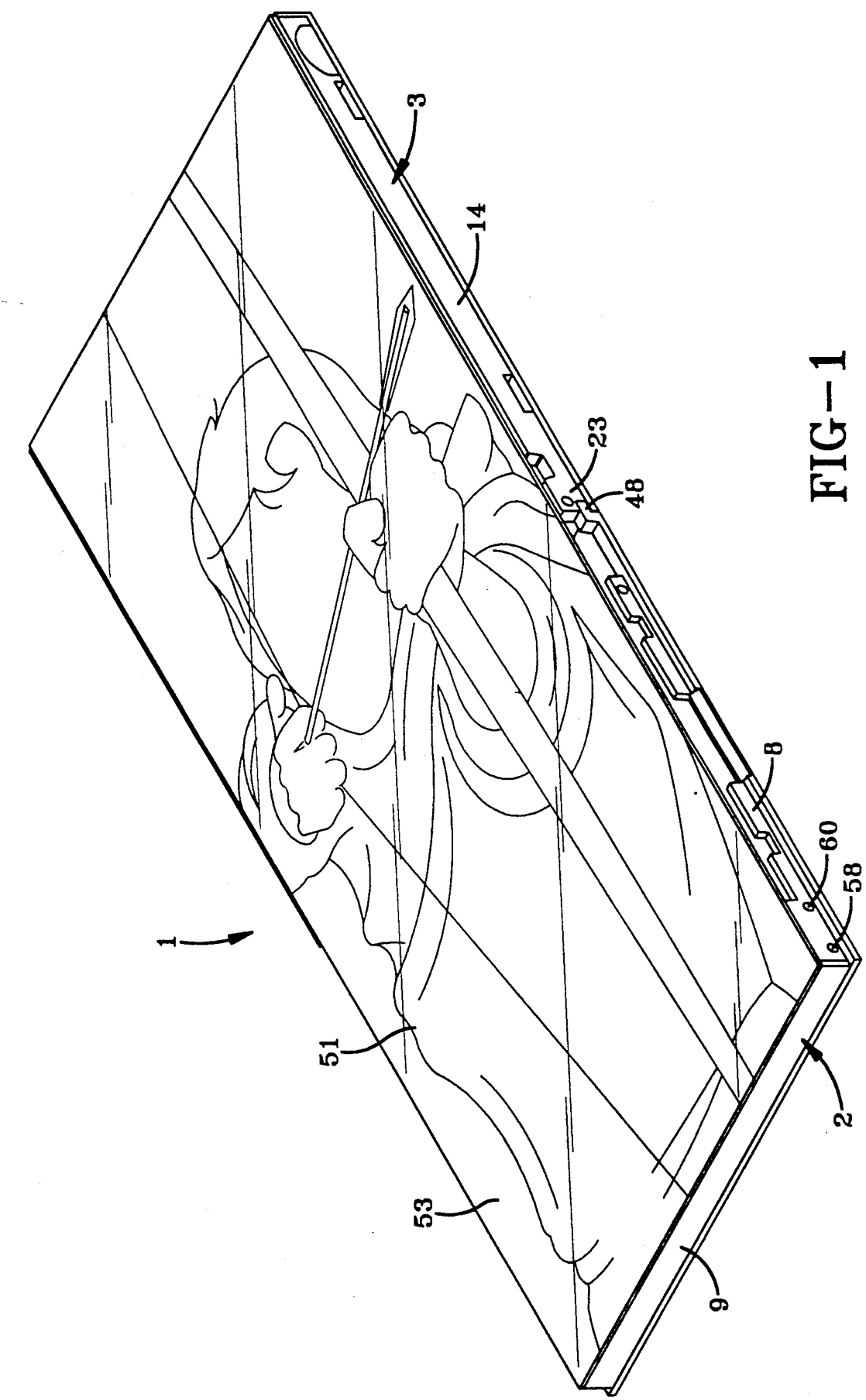
FIG. 1 is a generally diagrammatic perspective view of the improved container in a display condition.

The improved container of the present invention is indicated generally at 1, and is shown in FIG. 1 in its fully assembled display condition. Container 1 includes as its main components best illustrated in FIG. 2, a base 2, a lid 3 and a compact disc carrying tray 4.

Base 2 has a generally rectangular configuration formed by a rectangular base panel 6, a pair of upstanding side walls 7 and 8, an end wall 9 and a thickened end 10. Lid 3 has a similar size and shape as base 2 and includes a rectangular lid panel 12, and a pair of upstanding side walls 13 and 14.

Compact disc carrying tray includes a generally flat panel 15 formed with a generally circular recess 16 for receiving a compact disc 18 therein. The term compact disc is referred to throughout as the particular recorded medium intended to be stored within container 1. However, other types of recorded medium may be stored such as CD ROMS, laser discs, video discs, etc. A flexible disc retaining hub 19 is formed in the center of recess 16 for insertion into the circular central hole 20 of compact disc 18 for releasably securing a compact disc within recess 16 in a manner well known in the art.

Base 2, lid 3 and tray 4 are formed of various types of plastic material, with base 2 and lid 3 usually being transparent with carrying tray 4 being of an opaque material. The overall size and construction of base 2, lid 3 and tray 4 are similar to the majority of jewel boxes presently utilized in the compact disc storage container art, with the novel modifications thereto being set forth below, which modifications enable the objectives of the invention to be obtained.

In accordance with the invention, lid 3 is formed with side wall extensions 22 and 23 which extend outwardly from side walls 13 and 14 respectively. Each side wall extension is provided with an inwardly extending pivot pin 24 and an end slot 49. A pair of graphic retention bars 25 is formed on the inside surface of lid panel 12 adjacent a swinging end 26 thereof to prevent graphic sheets from sliding out of the lid after placement therein. Carrying tray 4 is formed with a pair of pivot flanges 28 and 29 which extend outwardly from an end 30 of the tray, each of which is formed with a generally key shaped slot 31 into which pivot pins 24 are snap fitted to pivotally mount tray 4 on lid 3.

Figure 10:
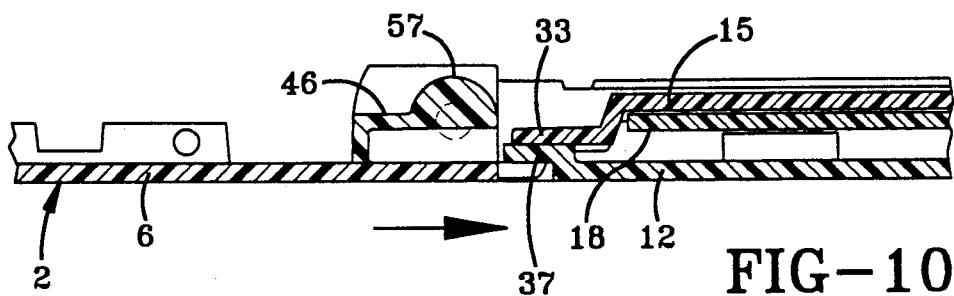
FIGS. 10-10C is a series of diagrammatic sectional views showing movement of the tray and lid from the unlocked extended position of FIG. 7 to the closed storage position of FIG. 11.

In further accordance with the invention, a pair of outwardly extending tabs 33 are formed integrally with base panel 15 of carrying tray 4 and extend outwardly from end 30 for slidable engagement within complementary shaped slots 35 formed in thickened end 10 of base 2, best shown in FIGS. 5, 8 and 10, the purpose of which is described more fully below. Lid 3 is formed with a pair of locking tabs 37 which are formed integrally with lid panel 12 and extend outwardly from end 38 thereof, and are generally complementary in shape and size with locking tabs 33 of carrying tray 4, and are slidably received within slots 35 along with tabs 33.

Figure 2:
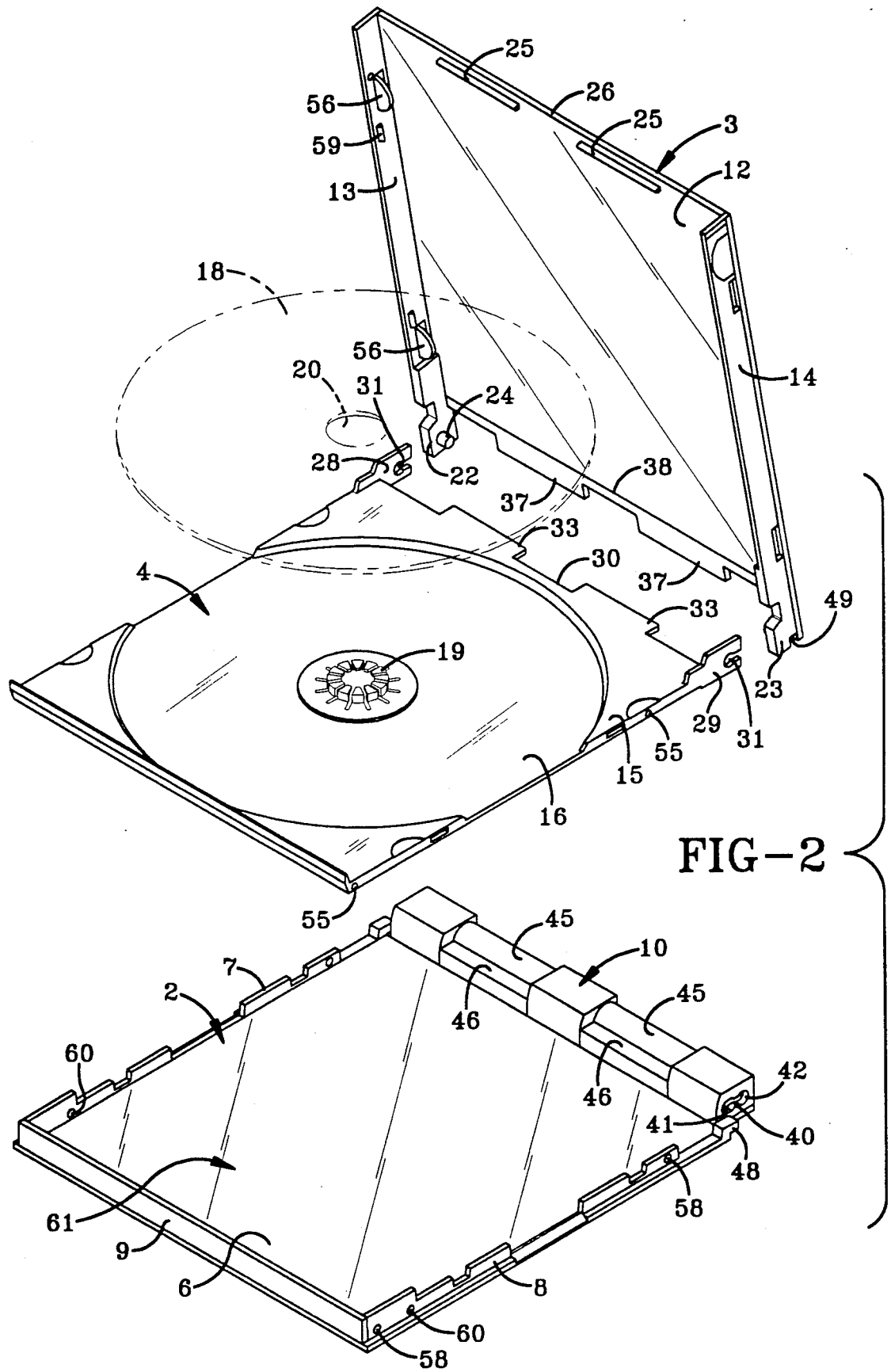
FIG. 2 is an exploded perspective view of the container with a compact disc shown in dot-dash lines.
Figure 5:
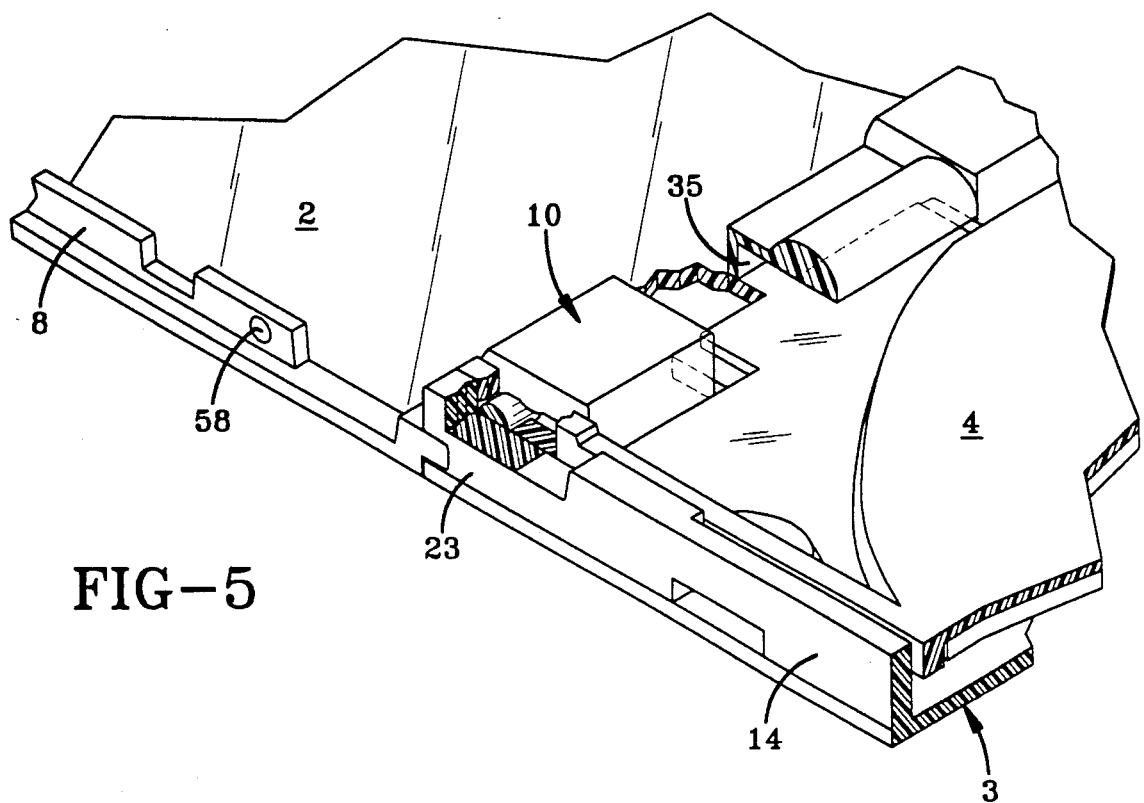
FIG. 5 is an enlarged fragmentary view with portions broken away and in section, showing the pivot and locking mechanism of the compact disc carrying tray, lid and base in the locked position of FIG. 3.
Figure 6:
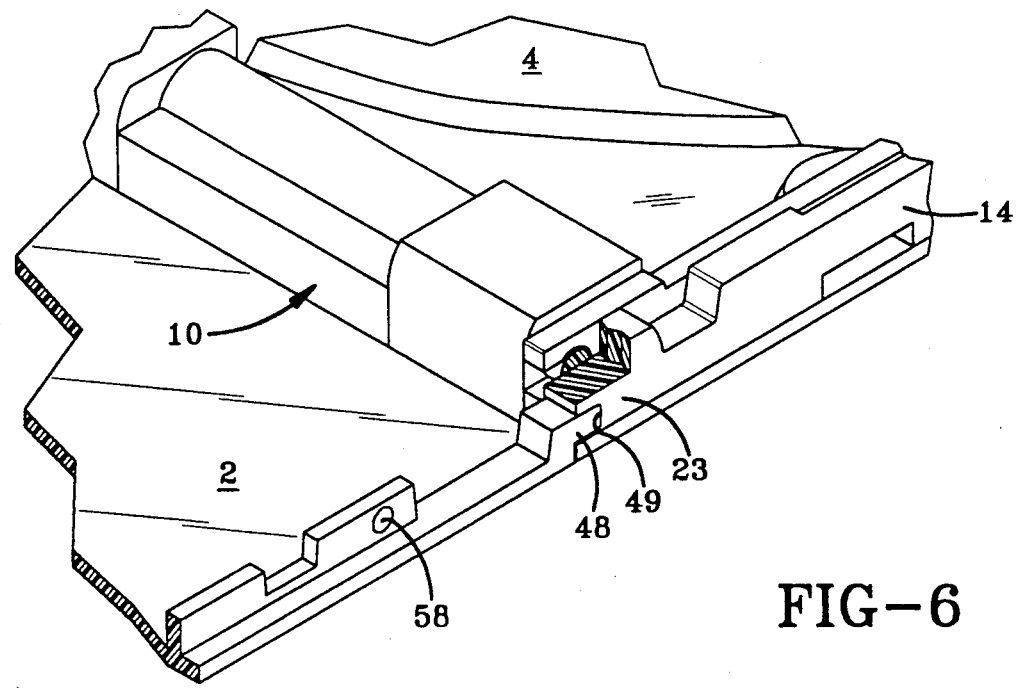
FIG. 6 is another enlarged fragmentary view with portions broken away in section, of the components shown in FIG. 5.
Figure 8:
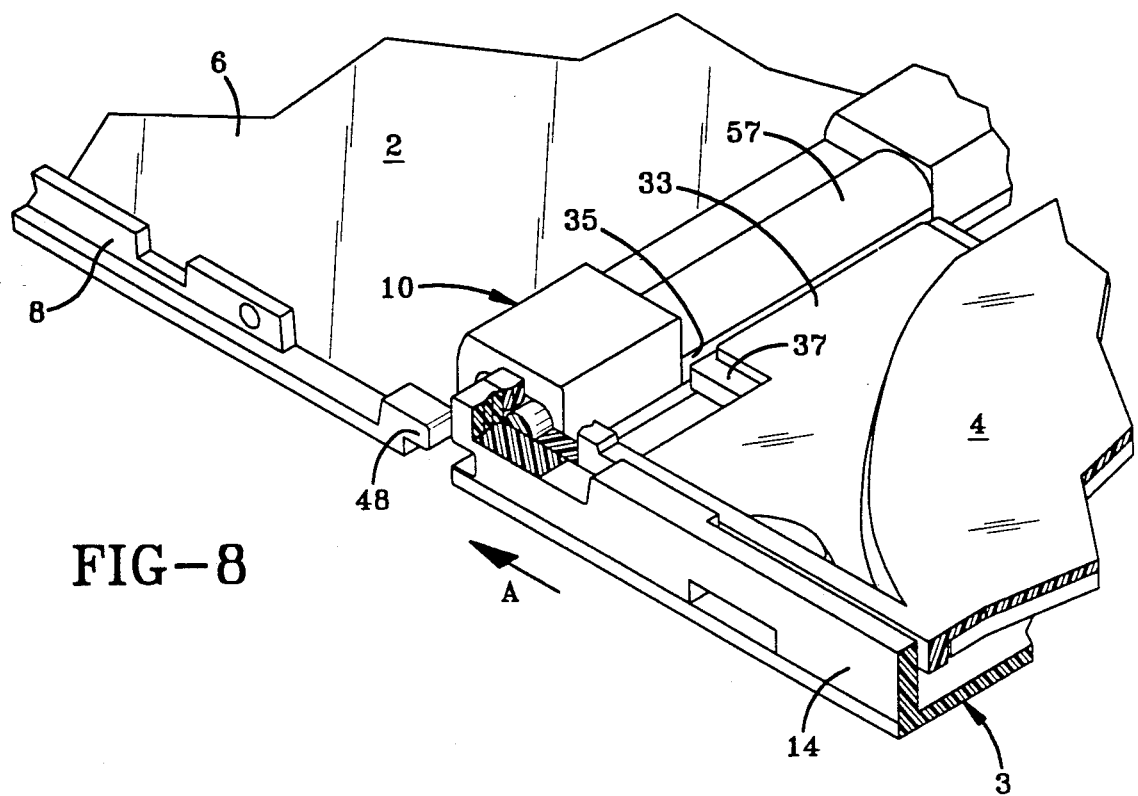
FIG. 8 is an enlarged fragmentary view with portions broken away and in section, showing the same components as in FIG. 5 but when the base and lid are in the extended unlocked position of FIG. 7.
Figure 9:
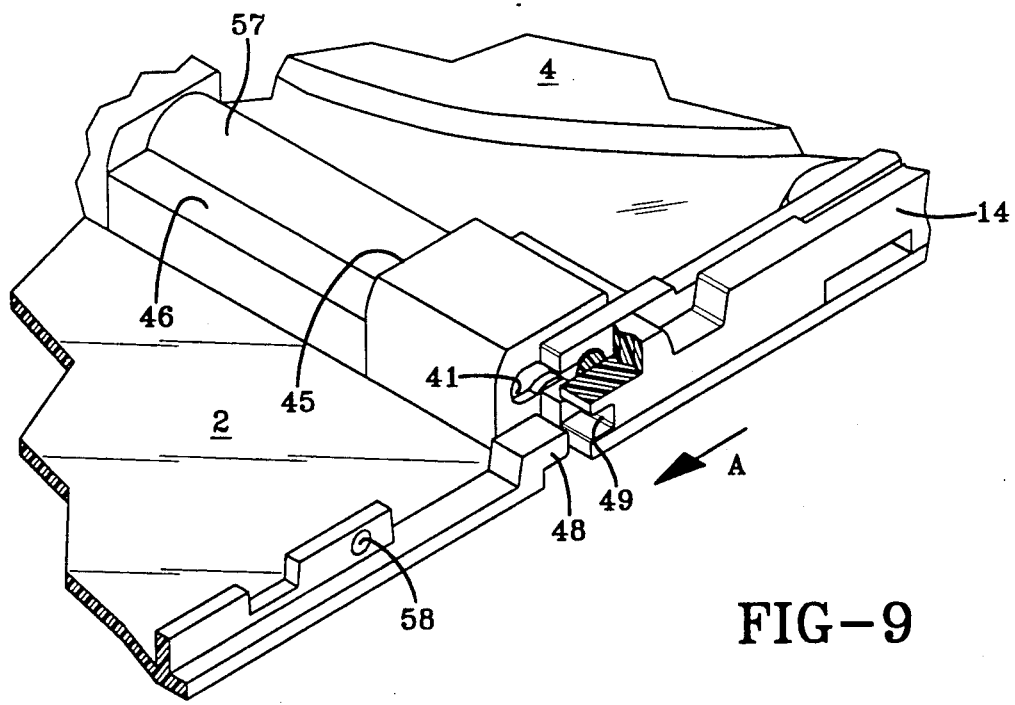
FIG. 9 is an enlarged fragmentary view with portions broken away and in section similar to FIG. 6, further showing the components of FIG. 8.

As discussed above, thickened end 10 of base 2 is provided with a pair of spaced slots 35 (FIGS. 5 and 8) for slidably receiving tabs 33 and 37 therein, when tray 4 is in a closed position with respect to lid 3 as shown in FIGS. 5 and 8, and lid 3 is in an end-to-end relationship with base 2. Thickened end 10 of base 2 further includes a pair of end slots 40 which are formed with two distinct pivot pin receiving positions 41 and 42 (FIG. 2). Thickened end portion 10 also is formed with a pair of top surface grooves 45 having inner stepped recesses 46, the purpose of which is discussed in greater detail below.

A pair of locking projections 48 (FIGS. 5, 6, 8 and 9) are formed on side walls 7 and 8 of base 2 adjacent the end surfaces of thickened end 10. These projections are slidably received within complementary shaped slots 49 formed in side wall extensions 22 and 23 of lid 3 to further lock the base and lid in the end-to-end relationship.

The manner and method of use of improved container 1 is set forth below, with particular reference to FIGS. 3-13. The base, lid and carrying tray, preferably are molded by usual injection molding as individual components, and are assembled easily by snap fitting pivot pins 24 of lid 3 into key shaped slots 31 of tray 4 to join the members together in a pivotal relationship.

Pivot pins 24 then are snapped into end slots 40 of base 10. This is easily accomplished since the lid, and in particular the side wall extensions 22 and 23 thereof, have sufficient flexibility, due to the nature of the plastic material used in the formation thereof, to permit the outward flexing of extension 22 and 23, to pivotal mount lid 3 on base 2.

Figure 7:
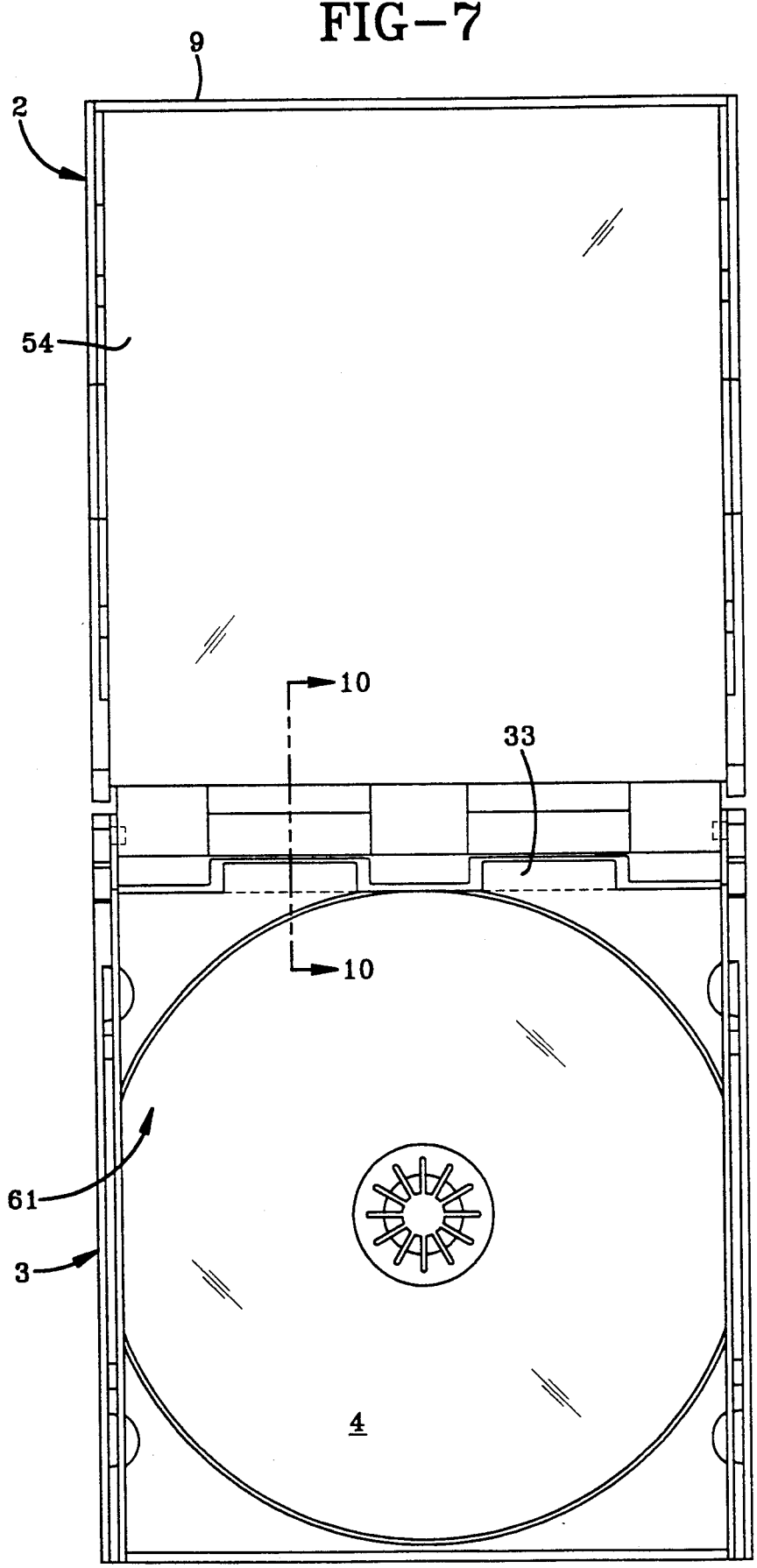
FIG. 7 is a top plan view similar to FIG. 3 showing the base and lid in an extended end-to-end unlocked position.

A compact disc 18 is loaded into tray recess 16 at any convenient time or location in the manufacturing and assembly process by its pressure engagement with retaining hub 19 in a usual manner. Tray 4 then is pivoted into closed position with lid 3 as shown in FIGS. 3-9, which places disc 18 in a secured and physically protected position between carrying tray 4 and lid 3. Next, lid 3 and tray 4 is laid in a flat end-to-end extended position with respect to base 2 wherein the lid and base lie in the same general plane as shown in FIG. 7. In this flat unlocked position shown in FIGS. 7-10, locking tabs 33 and 37 will be in stacked juxtaposition with respect to each other, aligned with slots 35 in thickened end 10 of base 2. Pivot pins 24 will be in the forward pivot pin receiving position 42 of end slots 40. Movement of base 2 and lid 3 toward each other in the direction of arrow A (FIGS. 8 and 9), will move locking tabs 33 and 37 into slots 35 and locking projection 48 into slots 49, simultaneous with the movement of pivot pins 24 into the inner pivot pin receiving position 41 as shown in FIGS. 3-6. If desired, each slot 35 can be replaced with a pair of stacked slots for individually receiving tabs 33 and 37 within a respective slot.

In this flat, extended and locked display position, compact disc 18 is supported on retaining hub 19 in a secured, physically protected position between lid 3 and carrying tray 4, and the locked lid and base provide a relatively rigid container free from twisting movement therebetween. Next, either a single or a pair of graphic sheets or cards 51 (FIGS. 1 and 4), preferably is placed over the top and bottom of extended locked base and lid. Sheet 51 will have printed thereon the appropriate graphics such as the author, list of songs, etc. recorded on the disc contained within container 1. Preferably this graphic sheet will be formed of a thin flexible sheet material enabling it to be easily folded, preferably in half, and then reinserted into the lid or base for permanent retention and display after the container has been purchased by a consumer.

Next, a clear plastic outer wrapping material 53 is placed about and encases container 1, including graphic sheet 51. Protective wrapping 53 physically protects the graphics from marring and removal, as well as preventing any movement of base 2 and lid 3 with respect to each other when they are in their locked display position. When in this locked position, container 1 can be displayed in usual racks for ease of viewing of the contents printed on the graphic cards or sheets, while increasing the overall size of the container to retard its unauthorized removal from the store. Also, container 1 retains the shape and size which is compatible with existing storage and display equipment.

Prior to being assembled into the display position, another graphics card 54 (FIGS. 3 and 7) having instructions printed thereon, may be placed within base 2 for instructing the customer how to place the container into its usual operating/storage condition after purchase. Instruction card 54 is hidden during display by the overlaying graphics sheet 51. After a customer has selected a desired compact disc for purchase from a display rack, the container together with the protective wrapping and graphics, are removed from the store by the purchaser after payment, without requiring the clerk to remove the container from a outer security package as in many prior compact disc security systems and packages.

The customer, after purchase, merely removes and disposes clear plastic outer wrapper 53, which will be the only packaging material requiring disposal, thereby making the overall package very acceptable ecologically. If desired, wrapper 53 may be formed of a recyclable material such as PET shrink wrap, thereby making container 1 even more ecological desirable.

Figure 10A:
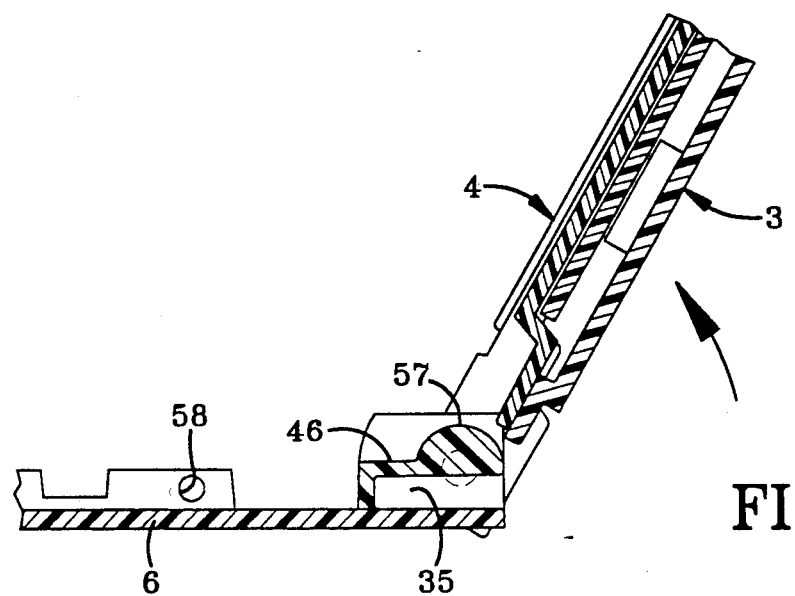
Figure 10B:
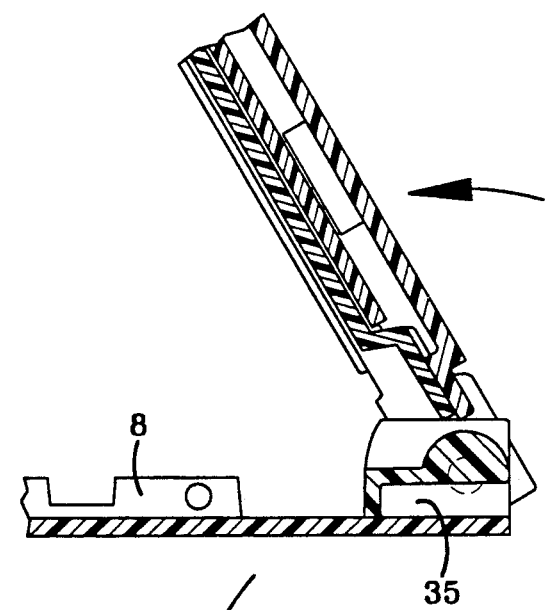
Figure 15:
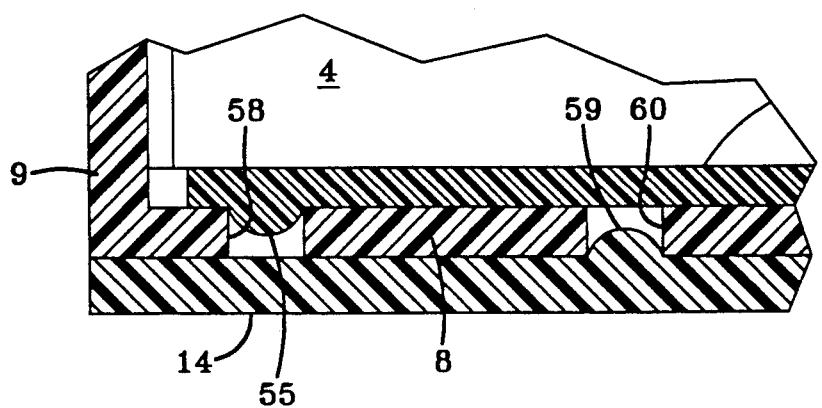
FIG. 15 is an enlarged fragmentary sectional view taken on line 15—15, FIG. 12.

Next, graphic sheet 51 is removed exposing direction card 54. The consumer, following the direction, merely pulls the lid and base longitudinally apart until a click is felt and/or heard, which indicates that pivot pins 24 have moved from inner pin receiving position 41 to outer pin receiving position 42. Then continuing to follow the instructions, lid 3 is pivoted to a closed position (FIGS. 11 and 12) on base 2 (See FIGS. 10A-10C), which in accordance with another of the main features of the invention, automatically carries with it tray 4 and compact disc 18. Upon moving to this position, two pairs of nubs 55 which are formed on the edges of tray 4 (FIGS. 2 & 15) snap into aligned holes 58 formed in side walls 7 and 8 of base 2 to secure tray 4 within the base. Another pair of nubs 59 is formed on side walls 13 and 14 of lid 3 and snap into aligned hole 60 formed in side walls 7 and 8 of base 2 to retain lid 3 in a closed storage position with base 2.

Next, the purchaser will take graphic cards 51 and by folding them in half, can insert them into lid 3 against panel 12 where they are retained by graphic retaining tabs 56 for ease of viewing through the clear plastic of lid panel 12. Also, the other graphic card can be folded in half and placed either in the interior of base 2 for viewing through the clear plastic base panel 6 where this graphic card will be retained and trapped by tray 4, or else secured beneath tabs 56 in lid 3. Graphic sheet 51 will be sufficiently thin, preferably paper-like, so as to be easily foldable and retained within the base or lid. Also, the back surface of instruction card 54 may already have the desired graphics printed thereon for viewing through base panel 6.

Figure 10C:
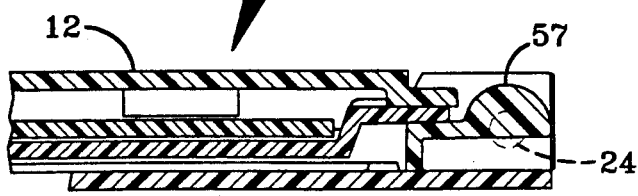
Figure 11:
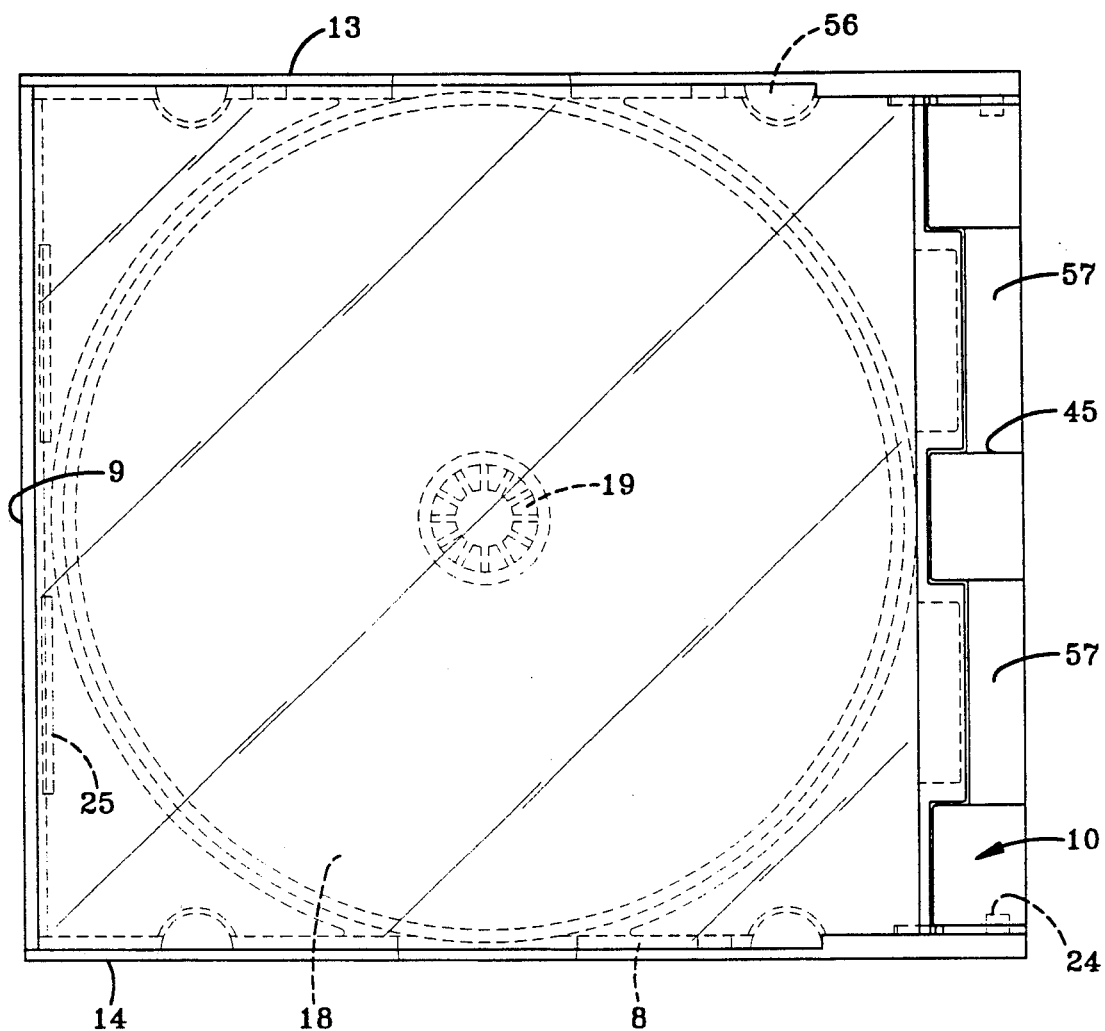
FIG. 11 is a top plan view of the container in its usual closed storage position containing a compact disc therein.
Figure 12:
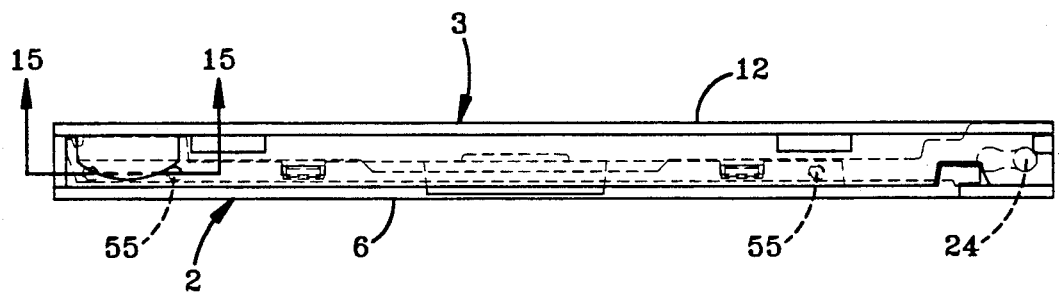
FIG. 12 is a side elevational view of the container shown in FIG. 11.
Figure 13:
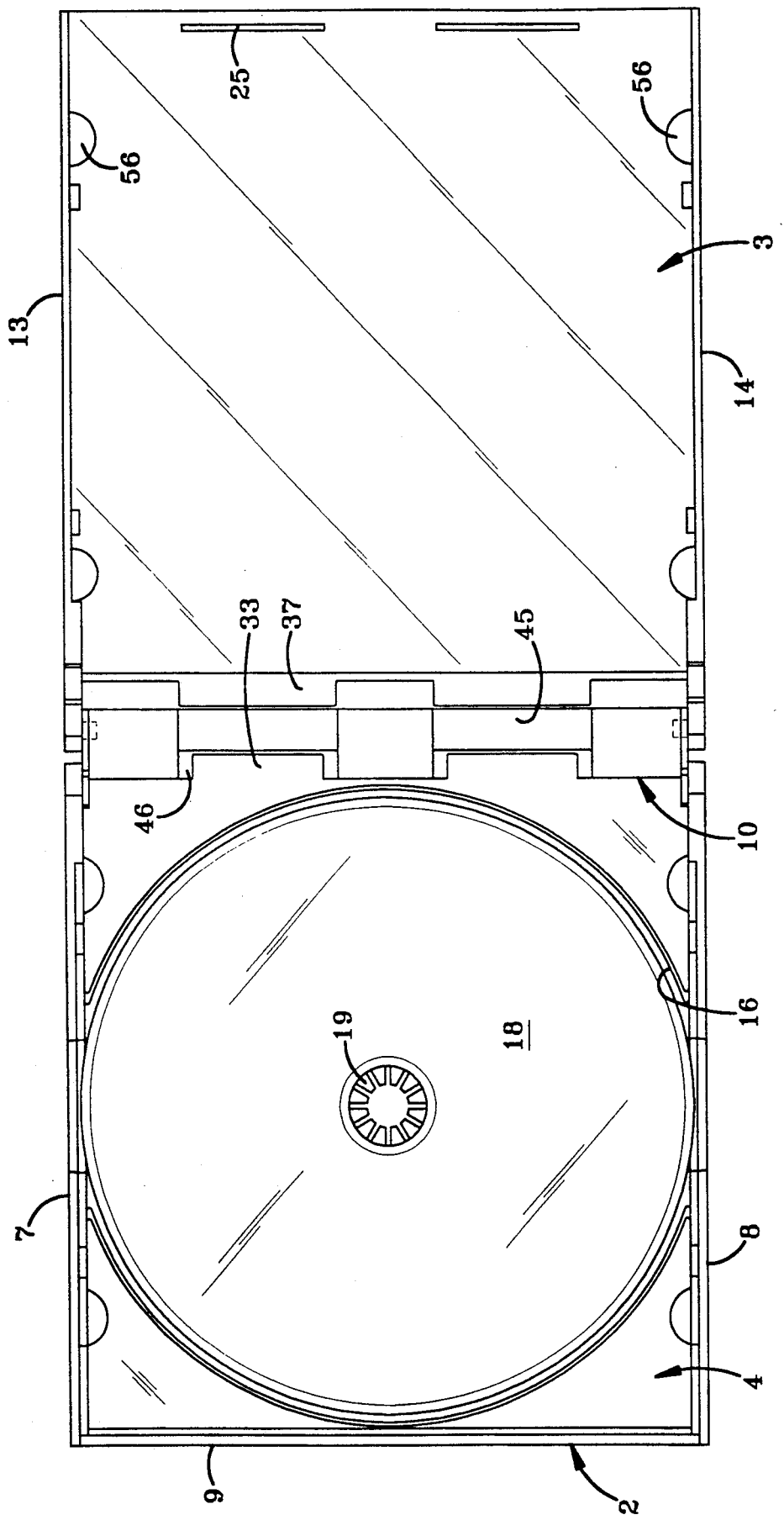
FIG. 13 is a plan view of the container in full open operating storage compartment access position.
Figure 14:
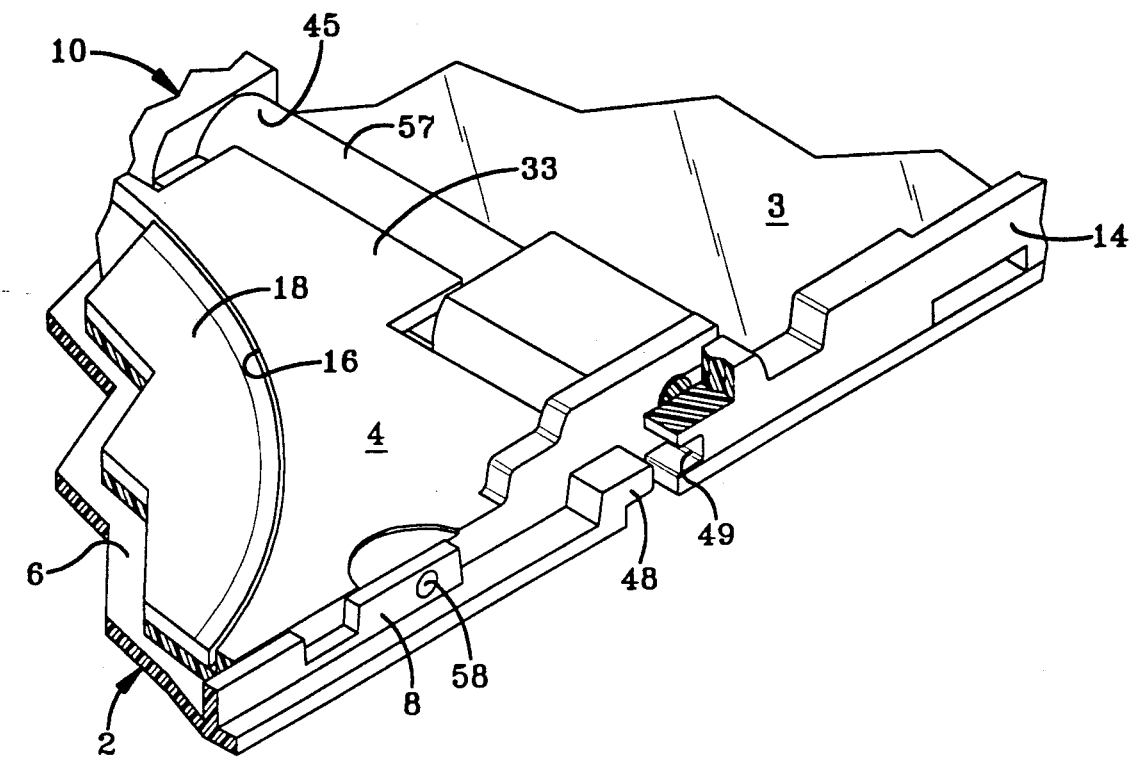
FIG. 14 is an enlarged fragmentary sectional view taken on line 10—10, FIG. 7.

When in the closed storage position, best shown in FIGS. 11 and 12, locking tabs 33 and 37 will align with each other and will lay on stepped recesses 46 of grooves 45 to render container 1 relatively dust proof, (FIGS. 10C and 14). Also, curved surfaces 57 which extend between stepped recesses 46 and the top of groove surfaces 45, provide for the smooth pivotal movement of the tray and lid to the initial closed position as well as the subsequent pivotal movement of the lid repeatedly between open and closed storage access positions. If desired, stepped recesses 46 could be eliminated with curved surfaces 57 extending completely to base panel 6.

After the initial movement of the lid and carrying tray to the closed position with base 2, lid 3 then can be repeatedly moved from the closed storage position of FIGS. 11 and 12 to a storage compartment access position for the placement and removal of a compact disc into and from storage compartment 61 of base 2, by the pivotal connection of pivot pins 24 in the outer pivot pin receiving positions 42 of end portion 10. Thus, the customer merely uses container 1 as he or she would use a regular compact disc storage jewel box. Pivot pins 24 are retained in outer pivot pin receiving position 42 by the entrapment of pivot pins 24 in key shaped slot 31 of tray 4, after tray 4 has been snapped into its permanent position within base 2, preventing the lid and base from being accidentally moved into the extended display position while the tray remains in the base.

Thus, the improved container provides for the display of a compact disc in a secure, physically protected condition by the use of three moldable components which are easily assembled into an operable position by the snap fitting of a pair of pivot pins into associated slots. Also once a customer has initially moved the lid, which automatically carries with it the tray and compact disc into its automatic locked position in the storage compartment of the base 2, the container is operated in a usual manner for the placement and removal of a compact disc into and from storage compartment 61 of base 2. Also the informational graphics is initially displayed on the exterior of the package and then subsequently, permanently retained within the container, requiring only the outer clear plastic protective wrapping to be discarded making it an ecological desirable product.

Container 1 enables full graphics sheets to be utilized as in prior "long boxes" or cardboard containers. Also, tray 4 can be removed easily from lid 3 for repackaging with a different recorded medium and then snapped back into position on lid 3. Likewise, even if a shoplifter removes the outer wrapper, the compact disc remains locked in a protected position requiring further unauthorized manipulations of the container before the disc can be unlawfully removed, further deterring theft.

Accordingly, the improved container for a compact disc is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved container for a compact disc is constructed and used, the characteristics of the construction, and the advantageous, new and useful results obtained; the new and useful structure, devices, elements, arrangements, parts and combinations, are set forth in the appended claims.

We claim:

1. A container for displaying and storing a recorded medium, including:
   a) a base;
   b) a lid pivotally mounted on the base for movement between a fully open display position, in which position the lid extends generally in the same plane as the base, and a closed storage position wherein the lid is juxtaposed on the base for retaining the recorded medium therebetween;
   c) first lock means for maintaining the lid in its fully open display position;
   d) a tray having means therein for holding the recorded medium between the lid and said tray when the lid is in the fully open display position and for holding the medium within the base after the lid has been moved to the closed storage position; and
   e) pivot means for moving the lid between the fully open position and the closed position, and for moving the tray from a juxtaposition with the lid when the lid is in the fully open position to a position within the base after the lid has moved to the closed position.

2. A container for displaying and storing a recorded medium, including:
   a) a base;
   b) a lid pivotally mounted on the base for movement between a fully open display position, in which position the lid extends generally in the same plane as the base, and a closed storage position wherein the lid is juxtaposed on the base for retaining the recorded medium therebetween;
   c) first lock means for maintaining the lid in its fully open display position, said lock means having tabs formed on the base and slots formed in the lid for receiving the tabs therein when the base and lid are in the fully open display position;
   d) a tray having means therein for holding the recorded medium between the lid and said tray when the lid is in the fully open display position and for holding the medium within the base after the lid has been moved to the closed storage position.

3. A container for displaying and storing a recorded medium, including:
   a) a base;
   b) a lid pivotally mounted on the base for movement between a fully open display position, in which position the lid extends generally in the same plane as the base, and a closed storage position wherein the lid is juxtaposed on the base for retaining the recorded medium therebetween;
   c) first lock means for maintaining the lid in its fully open display position, said first lock means having a plurality of tabs formed on the lid and complementary shaped slots formed in the base in alignment with the lid tabs for slidably receiving the tabs therein when the base and lid are in the fully open display position; and
   d) a tray having means therein for holding the recorded medium between the lid and said tray when the lid is in the fully open display position and for holding the medium within the base after the lid has been moved to the closed storage position.

4. The container defined in claim 1 including graphics card means extending over at least part of the base and lid when the lid is in the fully open display position and for subsequent placement within the lid or base after the lid has been moved from said fully open position.

5. The container defined in claim 4 including an outer wrap of transparent plastic material enclosing the lid, base and graphics card means when the lid is in its fully open display position.

6. The container defined in claim 1 in which the first lock means includes a plurality of tabs formed on the lid and complementary shaped slots formed in the base in alignment with lid tabs for slidably receiving the tabs therein when the base and lid are in the fully open display position.

7. The container defined in claim 6 including second lock means for maintaining the tray in juxtaposition with the lid when the lid is in the fully open display position.

8. The container defined in claim 7 in which the second lock means includes tab means formed on the tray slidably engageable within the slots formed in the base.

9. The container defined in claim 1 in which the pivot means includes a pair of spaced pivot pins formed on one of the lid and base, and a pair of slots for receiving said pins formed on the other of the base and lid.

10. The container defined in claim 9 in which the pivot pin slots have first and second pin receiving positions; and in which the pivot pins are movable between the two pin receiving positions within the slots upon movement of the lid and base with respect to each other when lying generally in the same plane.

11. The container defined in claim 10 in which the two position slots are formed on the base; and in which the pivot pins are formed on a pair of side wall extensions of the lid and project inwardly towards each other.

12. The container defined in claim 6 in which the base includes a thickened end portion; in which the tab receiving slots are formed in the thickened end portion for receiving the tabs when the lid is in the fully open display position; and in which groove means are formed in said thickened end portions for receiving the lid tabs when the lid is in the closed storage position.

13. The container defined in claim 12 in which the groove means includes a stepped recess for receiving the lid tabs therein when the lid is in the closed position.

14. The container defined in claim 12 including a pair of spaced pivot pins formed on the lid; and in which a pair of slots are formed in spaced ends of the thickened end portion of the base for pivotally mounting the pivot pins thereon.

15. The container defined in claim 10 in which the pivot pin slots have first and second pin receiving positions; in which the pivot pins are in the first pin receiving position when the lid is in the fully open display position; and in which the lid is freely movable between the closed storage position and an open storage access position for placement and removal of the recorded medium into and from the tray when the pivot pins are in the second pin receiving positions.

16. The container defined in claim 1 including means for holding the tray within the base after the lid has been moved to the closed storage position.

17. The container defined in claim 1 in which the recorded medium is a compact disc.

* * * * *